(12) United States Patent
Abedini et al.

(10) Patent No.: US 9,307,510 B2
(45) Date of Patent: Apr. 5, 2016

(54) RESOURCE ALLOCATION FOR DISTRIBUTED DEVICE-TO-DEVICE SYNCHRONIZATION

(71) Applicant: QUALCOMM Incorporated, San Diego, CA (US)

(72) Inventors: Navid Abedini, Raritan, NJ (US); Nilesh Nilkanth Khude, Bangalore (IN); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/457,889

(22) Filed: Aug. 12, 2014

(65) Prior Publication Data

US 2015/0063343 A1    Mar. 5, 2015

Related U.S. Application Data

(60) Provisional application No. 61/874,309, filed on Sep. 5, 2013.

(51) Int. Cl.
*H04J 3/06*         (2006.01)
*H04W 56/00*        (2009.01)

(52) U.S. Cl.
CPC ........ *H04W 56/0045* (2013.01); *H04W 56/002* (2013.01); *H04W 56/0015* (2013.01)

(58) Field of Classification Search
CPC .................... H04W 56/0045; H04W 56/0015; H04W 56/002
See application file for complete search history.

(56) References Cited

U.S. PATENT DOCUMENTS

| | | | | |
|---|---|---|---|---|
| 2011/0299472 A1* | 12/2011 | Kumar | ................. | H04B 7/2656 370/328 |
| 2013/0108000 A1* | 5/2013 | Park | ..................... | H04J 3/0676 375/362 |
| 2013/0308625 A1* | 11/2013 | Park | ..................... | H04W 56/002 370/350 |
| 2013/0336307 A1* | 12/2013 | Park | ..................... | H04W 56/002 370/350 |
| 2014/0064263 A1* | 3/2014 | Cheng | .................... | H04W 8/005 370/350 |
| 2014/0169361 A1* | 6/2014 | Kim | .................. | H04W 56/0015 370/350 |
| 2015/0009949 A1* | 1/2015 | Khoryaev | ............. | H04W 48/16 370/330 |
| 2015/0043545 A1* | 2/2015 | Cheng | ................... | H04W 56/00 370/336 |

OTHER PUBLICATIONS

ISA/EPO, International Search Report and Written Opinion of the International Searching Authority, Int'l App. No. PCT/US2014/051492, Oct. 29, 2014, European Patent Office, Rijswijk, NL, 11 pgs.
(Continued)

*Primary Examiner* — Clemence Han
(74) *Attorney, Agent, or Firm* — Holland & Hart LLP

(57) ABSTRACT

Methods, systems, and devices are described for synchronizing a user equipment (UE) in a device-to-device communications network. The UE may scan for a synchronization signal transmitted from another UE in the network. A synchronization frame including a plurality of slots to use may be identified based at least in part on a result of the scanning. The identified synchronization frame may be analyzed to select a slot to use from the plurality of slots of the synchronization frame. A synchronization signal may be transmitted using the identified synchronization frame and the selected slot.

28 Claims, 9 Drawing Sheets

(56) References Cited

OTHER PUBLICATIONS

LG Electronics, "Synchronization for D2D Communications," 3GPP TSG RAN WG1 Meeting #74, Barcelona, Spain, Aug. 19-23, 2013, R1-133384, pp. 1-11, downloaded from http://www.3gpp.org/ftp/tsg_ran/wg1_rl1/TSGR1_74/Docs/, 3rd Generation Partnership Project.

QUALCOMM Incorporated, "Techniques for Synchronization," 3GPP TSG-RAN WG1 #74, Aug. 19-23, 2013, Barcelona, Spain, R1-133598, pp. 1-9, downloaded from http://www.3gpp.org/ftp/tsg_ran/wg1_rl1/TSGR1_74/Docs/, 3rd Generation Partnership Project.

ZTE, "Discussion of D2D Discovery," 3GPP TSG RAN WG1 #74, Barcelona, Spain, Aug. 19-23, 2013, R1-133149, pp. 1-10, downloaded from http://www.3gpp.org/ftp/tsg_ran/wg1_rl1/TSGR1_74/Docs/, 3rd Generation Partnership Project.

IPEA/EPO Second Written Opinion of the International Preliminary Examining Authority, Int'l App. No. PCT/US2014/051492, Jul. 15, 2015, European Patent Office, Munich, DE, 5 pgs.

Alcatel-Lucent et al., RAN 2 Impact on D2D Discovery, 3GPP TSG-RAN2 Meeting #87, Barcelona, Spain, Aug. 19-23, 2013, R2-132747, 5 pgs., 3rd Generation Partnership Project.

* cited by examiner

RESOURCE ALLOCATION FOR DISTRIBUTED DEVICE-TO-DEVICE SYNCHRONIZATION

CROSS REFERENCES

The present application for patent claims priority to U.S. Provisional Patent Application No. 61/874,309 by Abedini et al., entitled "Resource Allocation for Distributed Device-to-Device Synchronization," filed Sep. 5, 2013, and assigned to the assignee hereof.

FIELD OF THE DISCLOSURE

The following relates generally to wireless communication, and more specifically to synchronization in a distributed device-to-device network.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

A conventional synchronization procedure in LTE uses two special physical signals, a primary synchronization signal (PSS) and a secondary synchronization signal (SSS). These synchronization signals are broadcast by base stations every 5 milliseconds (ms). Further, these synchronization signals are sent by different base stations using the same physical resource, and may be distinguished from each other by the different sequence combinations (e.g., cell ids) respectively being used by each of the base stations.

The relatively frequent transmissions of synchronization signals in the conventional synchronization procedure often results in a relatively large power consumption being observed at the UEs, which may be prohibitive because of the battery dependence of typical UEs. While reducing the rate at which synchronization signals are sent may be desirable in order to reduce the energy penalty observed in the conventional synchronization procedure, this may impact performance of the receiver especially relative to its ability to track time and frequency errors accurately. Thus, there is a need for a synchronization method that allows to reduce power consumption without negatively impacting performance of the receiver.

SUMMARY

The described features generally relate to one or more improved systems, methods, and/or apparatuses for synchronization in a wireless device-to-device network. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

According to one aspect, a method of synchronization by a user equipment (UE) in a device-to-device communications network is described. In one configuration, the UE may scan for a synchronization signal transmitted from another user equipment in the network. The UE may identify a synchronization frame including a plurality of slots to use for transmitting a synchronization signal based at least in part on a result of the scan. The UE may analyze the identified synchronization frame to select a slot to use from the plurality of slots. The UE may transmit the synchronization signal using the identified synchronization frame and the selected slot.

In some examples, the identifying of the synchronization frame to use may involve randomly selecting the synchronization frame when no existing synchronization signal is detected during the scan. In some examples, the analyzing may involve identifying a plurality of empty slots in the synchronization frame, and randomly selecting the slot to use from the plurality of empty slots.

In some examples, selecting of the slot to use for transmitting a synchronization signal may be based on a synchronization resource being used by a base station in the network as detected during the scan. Further, in some examples, the identifying of the synchronization frame to use may involve determining the synchronization frame to use based on a synchronization resource being used by a base station in the network.

In some examples, the method may include identifying a synchronization resource being used when at least one existing synchronization signal transmitted from another user equipment in the network is detected by the scanning. Then, a slot of the identified synchronization frame of the identified synchronization resource may be selected to use.

Further, when at least one existing synchronization signal transmitted from another user equipment in the network is detected by the scanning, the selecting of the slot may involve selecting a different slot of the plurality of slots than slots being used for the at least one detected synchronization signal. In such examples, the selecting of the different slot may involve randomly selecting the different slot from the plurality of slots other than slots being used for the at least one detected synchronization signal. Alternatively, the selecting of the different slot may involve selecting the different slot to use based on a location of the slots being used for the at least one detected synchronization signal.

Further, when at least one existing synchronization signal transmitted from another user equipment in the network is detected by the scanning, the method may include determining a sequence of the at least one detected synchronization signal having a highest energy level. Then, a sequence for the synchronization signal to be transmitted may be selected that is different from the determined sequence.

Alternatively or additionally, when at least one existing synchronization signal transmitted from another user equipment in the network is detected by the scanning, the method may include determining whether one or more slots of the plurality of slots of the identified synchronization frame are empty. Then, upon determining one or more slots to be empty, one of the one or more empty slots may be selected to use.

In such examples, the method may include selecting a sequence for the synchronization signal to be transmitted from an allowable subset of sequences. The allowable set of sequences may exclude sequences that are reserved, for example, for in network user equipment.

Further, in examples of the method that include determining whether one or more slots of the plurality of slots of the identified synchronization frame are empty, the method may involve, upon determining none of the slots to be empty, determining an energy level of each of the detected synchronization signals in the plurality of slots. In such examples, the method may include comparing each determined energy level to a threshold energy level. Based on a result of the comparing, the UE may abstain from the selecting of a slot to use and may abstain from transmitting a synchronization signal. In such examples, the UE may abstain from the selecting of a slot to use and from the transmitting of a synchronization signal when the result of the comparing is that each determined energy level satisfies the threshold energy level.

Further, in examples in which it is determined that none of the slots are empty and the energy level of each of the detected synchronization signals in the plurality of slots is determined, the method may involve comparing each determined energy level to a threshold energy level. Based on a result of the comparing, the UE may select a slot of the plurality of slots with a detected synchronization signal having a lowest energy level. In such examples, the method may further include selecting a sequence for the synchronization signal to be transmitted from an allowable subset of sequences. The allowable set of sequences may exclude sequences that are reserved, for example, for in network user equipment.

In some examples, the selecting of the slot of the plurality of slots with the detected synchronization signal having the lowest energy level may be performed when the result of the comparing is that at least one of the determined energy levels fails to satisfy the threshold energy level. In such examples, the method may include selecting a sequence for the synchronization signal to be transmitted that is different from a determined sequence of the detected synchronization signal having a highest energy level in the selected slot. Further, in such examples, the method may include selecting a sequence for the synchronization signal to be transmitted from an allowable subset of sequences. The allowable set of sequences may exclude sequences that are reserved, for example, for in-network user equipment.

In another aspect, an apparatus for synchronization in a device-to-device communications network is described. In one configuration, the apparatus may include means for scanning for a synchronization signal transmitted from another user equipment in the network; means for identifying a synchronization frame including a plurality of slots to use based at least in part on a result of the scanning; means for analyzing the identified synchronization frame to select a slot to use from the plurality of slots of the synchronization frame; and means for transmitting a synchronization signal using the identified synchronization frame and the selected slot. In certain examples, the apparatus may include means for implementing one or more aspects of the functionality described above with reference to the method of synchronization by a user equipment in a device-to device communications network.

In another aspect, an apparatus for synchronization in a device-to-device communications network is described. In one configuration, the apparatus may include a processor and a memory in electronic communication with the processor. Instructions may be stored in the memory. The instructions may be executable by the processor to: scan for a synchronization signal transmitted from another user equipment in the network; identify a synchronization frame including a plurality of slots to use based at least in part on a result of the scanning; analyze the identified synchronization frame to select a slot to use from the plurality of slots of the synchronization frame; and transmit a synchronization signal using the identified synchronization frame and the selected slot. In certain examples, the instructions when executed by the processor may further cause the processor to perform one or more aspects of the functionality described above with reference to the method of synchronization by a user equipment in a device-to device communications network.

In yet another aspect, a computer program product for synchronization by a user equipment in a device-to-device communications network is also described. The computer program product may be a non-transitory computer readable medium. The computer readable medium may store instructions executable by a processor to: scan for a synchronization signal transmitted from another user equipment in the network; identify a synchronization frame including a plurality of slots to use based at least in part on a result of the scanning; analyze the identified synchronization frame to select a slot to use from the plurality of slots of the synchronization frame; and transmit a synchronization signal using the identified synchronization frame and the selected slot. In certain examples, the instructions may further cause the processor to perform one or more aspects of the functionality described above with reference to the method of synchronization by a user equipment in a device-to device communications network.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure is directed to methods, apparatuses, systems, and devices for managing synchronization of user equipments (UEs) in a wireless device-to-device communications. In particular, the disclosed example methods, apparatuses, systems and devices for managing synchronization of UEs are directed to reducing power consumption that may be observed when using conventional synchronization techniques. Furthermore, the synchronization management techniques described herein may help reduce, or even eliminate, the need for using one or more base stations for synchronization between UEs.

In the various examples, a UE may scan for a synchronization signal or signals transmitted from one or more other UEs in the network and use a result of the scan to identify a synchronization frame, including a plurality of slots, for transmitting a synchronization signal. In the case where at least one synchronization signal is detected during the scan, this may involve identifying a synchronization resource and/or a synchronization frame that is being used by one or more other UEs. When no existing synchronization signal is detected during the scan a random selection process for selecting the synchronization frame may be used.

In some examples, the UE may analyze the identified synchronization frame to select a slot to use for sending the synchronization signal from the plurality of slots. The UE may transmit the synchronization signal using the identified synchronization frame and the selected slot. In the case when the UE detects one or more existing synchronization signals, the UE may analyze the identified synchronization frame to determine whether any of the slots are empty or all of the slots are being used for transmitting synchronization signals by other UEs. The UE may further analyze the identified synchronization frame to determine one or more of the respective energy levels of the detected synchronization signals, and to determine one or more of the respective sequences of the detected synchronization signals. Based on such analysis, the UE may determine which of the slots to use for sending its synchronization signal, what sequence to use, or even whether to abstain from selecting a slot and from transmitting the synchronization signal altogether.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
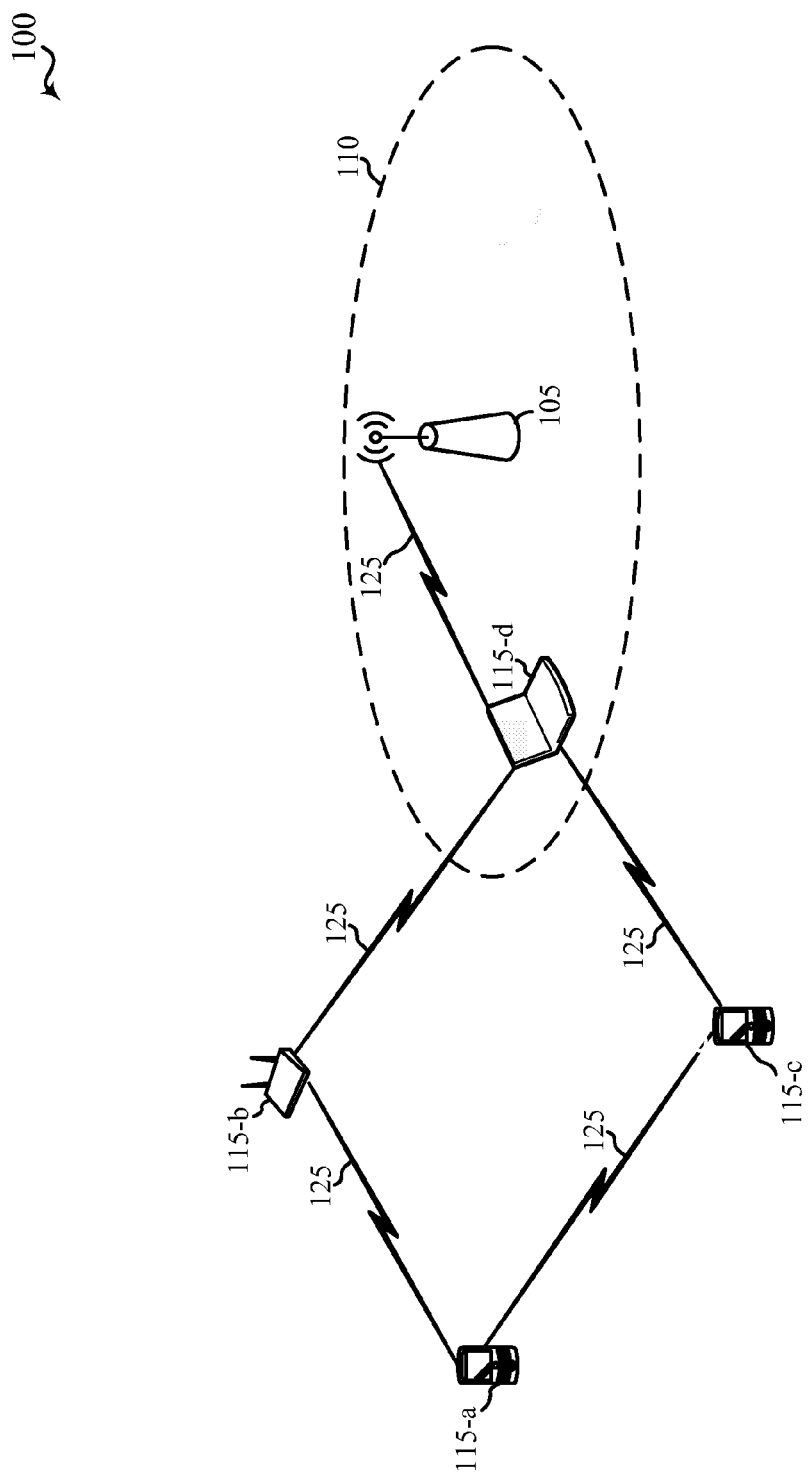
FIG. 1 shows a block diagram of a wireless communications system.

Referring first to FIG. 1, a block diagram illustrates an example of a wireless device-to-device communications system. The wireless device-to-device communications system 100 may include a base station (cell) or access point 105, and communication devices or user equipments (UEs) 115. The system may also include a base station controller (not shown), and a core network (not shown). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The wireless device-to-device communications system 100 may be a multi-carrier LTE network capable of efficiently allocating network resources.

The base station 105 may wirelessly communicate with the communication devices 115 via a base station antenna (not shown). The base station 105 may communicate with the communication devices 115 under the control of the base station controller via multiple carriers. Each base station 105 site may provide communication coverage for a respective geographic area. In some examples, a base station 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. A coverage area 120 for a base station may be divided into sectors making up only a portion of the coverage area (not shown). The wireless device-to-device communications system 100 may include one or more base stations 105 of different types (e.g., macro, micro, and/or pico base stations). There may be overlapping coverage areas for different technologies. A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius).

The communication devices 115 may be dispersed throughout the coverage area 110, or may be located outside the coverage area 110. Each communication device 115 may be stationary or mobile. In one configuration, the communication devices 115 may be able to communicate with different types of base stations such as, but not limited to, macro base stations, pico base stations, and femto base stations, via transmission links 125. The communication devices 115 may be referred to as mobile stations, mobile devices, access terminals (ATs), user equipments (UEs), subscriber stations (SSs), or subscriber units. The communication devices 115 may include cellular phones and wireless communications devices, but may also include personal digital assistants (PDAs), other handheld devices, netbooks, notebook computers, tablet computers, etc.

The transmission link 125 between a communication device 115-d and the base station 105 may include uplinks (ULs) for uplink transmissions from the UE 115-d to the base station 105, and/or downlinks (DLs) for downlink transmissions, from the base station 105 to the UE 115-d. The downlink transmissions may also be called forward link transmissions, while the uplink transmissions may also be called reverse link transmissions.

In one example, the network controller may be coupled to a set of base stations and provide coordination and control for these base stations. The controller may communicate with the base stations via a backhaul link (not shown). The base stations may also communicate with one another directly or indirectly and/or via wireless or wireline backhaul links.

Focusing on a particular UE 115-a, transmission links 125 to UE 115-b and 115-c, as well as transmission links 125 between UE 115-d and both UE 115-b and 115-c, represent device-to-device communications. To support such communications, the UEs 115 may need to be synchronized. In the example shown, the UE 115-d located within the coverage area 110 of a base station 105 may be synchronized with the base station 105. The UEs 115-*a*, 115-*b* and 115-*c*, however, cannot as they are located outside the coverage area 110 of the base station 105. Thus, in order to synchronize all of the UEs 115, the UEs 115 may transmit synchronization signals to each other. As described further below with reference to FIGS. 2-8, the UEs 115 may employ various techniques to synchronize for device-to-device communications. For example, the device 115-*a* may scan or "listen" for existing synchronization signals being transmitted by the other UEs 115-*b*, 115-*c* and 115-*d*. Depending on whether or not any such synchronization signals are detected by the UE 115-*a*, the various techniques described further below may be used to determine synchronization resources for the UE 115-*a* to use for transmission of its own synchronization signal. Synchronization by the UEs 115 according to the techniques discussed herein may improve power efficiency, and may allow for device-to-device communications even in the absence of a base station or when all of the UEs are located outside the coverage area of any base station.

Figure 2A:
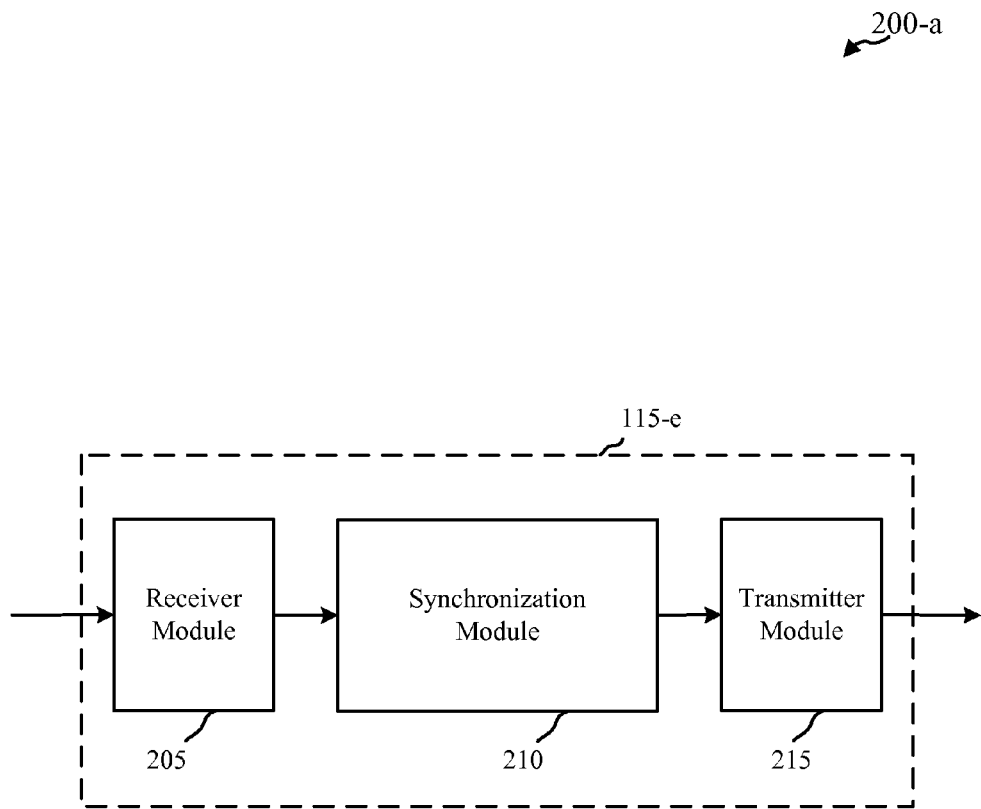
FIG. 2A shows a block diagram of an example of a UE.

Referring now to FIG. 2A, a block diagram 200-*a* illustrates an example of a UE 115-*e* that may manage synchronization procedures, in accordance with various examples. The UE 115-*e* may be an example of one or more aspects of the UEs 115 described with reference to FIG. 1. The UE 115-*e* may include a receiver module 205, a synchronization module 210, and/or a transmitter module 215. Each of these components may be in communication with each other.

The components of the UE 115-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-*e*.

The receiver module 205 may include any number of receivers, and in some cases may include one or more cellular receivers and/or a wireless local area network (WLAN) receiver. The one or more cellular receivers may include an LTE/LTE-A and/or GSM receiver. The receiver module 205 may be used to receive various types of data and/or control signals over a wireless communications system such as the wireless communications system 100 shown in FIG. 1.

The transmitter module 215 may include any number of transmitters, and in some cases may include one or more cellular transmitters and/or a WLAN transmitter. The one or more cellular transmitters may include an LTE/LTE-A and/or GSM transmitter. The transmitter module 215 may be used to transmit various types of data and/or control signals over a wireless communications system such as the wireless communications system 100.

The synchronization module 210 may perform various synchronization management functions described above with reference to FIG. 1. For example, the synchronization module 210 may perform a scan for existing transmissions of synchronization signals. In one example the scan may be performed upon startup of the UE 115-*e*. The scan may result in the identification of one or more synchronization signals being transmitted by other UEs 115. The synchronization module 210 may further determine synchronization resources used for the transmissions of synchronization signals by other UEs, as well as resources to use for transmission of its synchronization signal. In some examples, the synchronization module 210 may also determine whether or not to transmit a synchronization signal. Upon synchronization with other UEs, the UE 115-*e* may perform wireless device-to-device communications using the receiver and transmitter modules 205, 215. The synchronization module 210 may perform other functions as well, such as described further below.

Figure 2B:
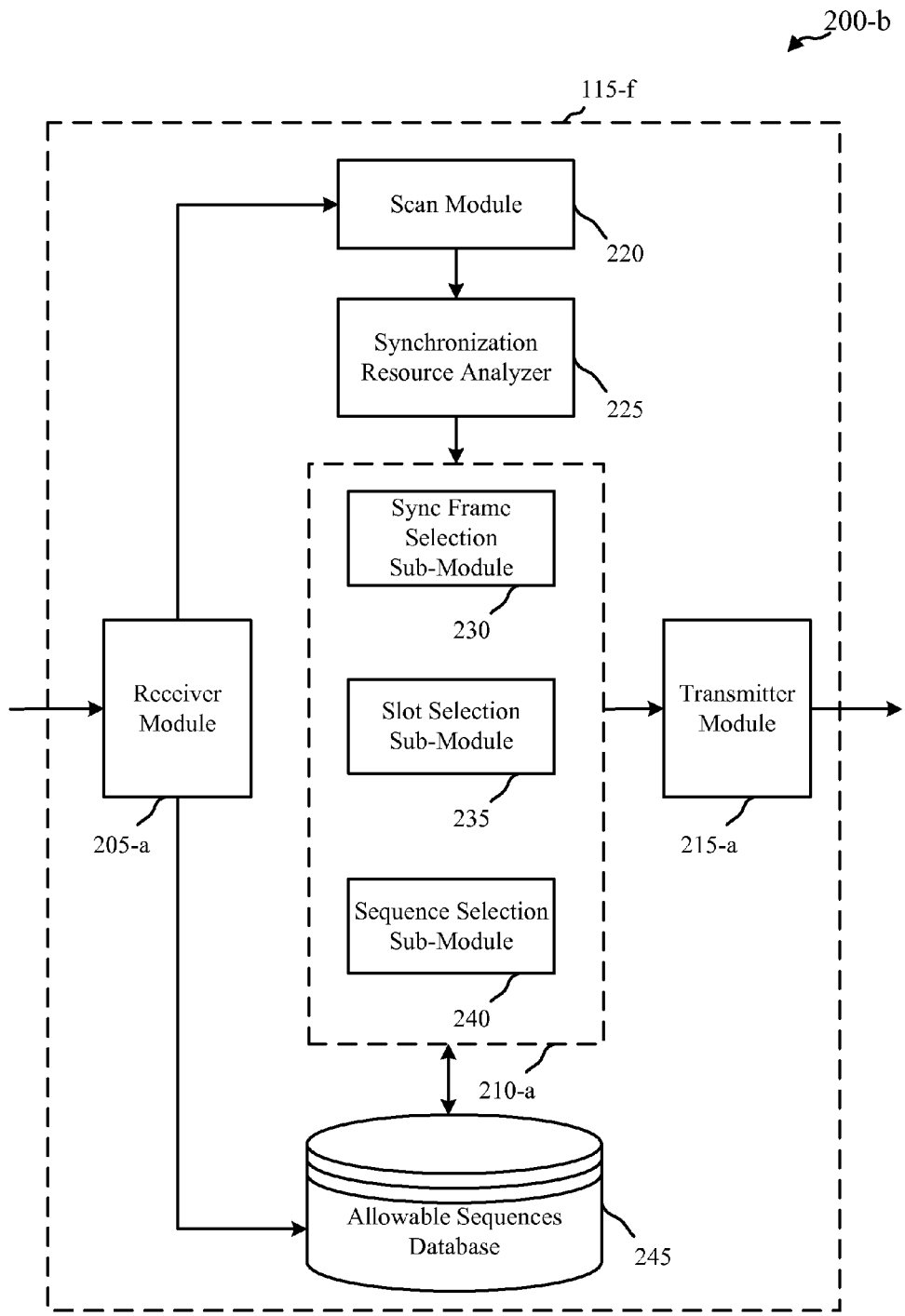
FIG. 2B shows a block diagram of another example of a UE with more detail of an exemplary synchronization module.

FIG. 2B is a block diagram 200-*b* illustrating another example of a UE 115-*f* that may manage synchronization operations, in accordance with various examples. The UE 115-*f* may be an example of one or more aspects of the UEs 115 described with reference to FIG. 1 and/or FIG. 2A. The UE 115-*f* may include a receiver module 205-*a*, a synchronization module 210-*a*, and/or a transmitter module 215-*a*. The UE 115-*f* may further include a scan module 220, a synchronization resource analyzer 225 and/or an allowable resources database 245. Each of these components may be in communication with each other.

The components of the UE 115-*f* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-*f*.

The receiver module 205-*a* and transmitter module 215-*a* may be configured similarly to what is described with respect to FIG. 2A. The synchronization module 210-*a* may be an example of one or more aspects of the synchronization module 210 described with reference to FIG. 2A, and may include a synchronization frame selection sub-module 230, a slot selection sub-module 235, and/or a sequence selection sub-module 240.

In some examples, the scan module 220 may scan for existing synchronization signals based on the operation of the synchronization module 210-*a*. For example, the synchronization module 210-*a* may cause the scan module 220 to perform an initial scan upon startup of the UE 115-*f*, and may also cause the scan module 220 to perform a subsequent scan as needed. Subsequent scans may be needed, for example, if synchronization is lost or if the UE 115-*f* is mobile and enters a different network for device-to-device communications.

In some examples, the synchronization resource analyzer 225 may analyze result of the scan to determine synchronization resources to use for transmission of a synchronization signal. In some cases, absence of synchronization signals may indicate that the UE 115-*f* is a first UE to transmit synchronization signal. In such case, the UE 115-*f* may be able to select any of the available synchronization resources for transmission of a synchronization signal. Alternatively, the UE may take the base station's 105 use of synchronization resources into account while selecting the synchronization resources. In the event one or more synchronization signals are detected during the scan as being transmitted by one or more other UEs, the synchronization management module 210-*a* may use results of the analysis from the synchronization resource analyzer 225 to determine synchronization resources to use for transmission of the synchronization signal. In various examples, the synchronization resource analyzer 225 may determine a synchronization frame that is being used for sending synchronization signals, a status of slots of the determined synchronization frame (e.g., in use or empty), an energy level of one or all of the detected synchronization signals, and/or a respective sequence being used for one or all of the detected synchronization signal.

The various determinations made by the synchronization resource analyzer 225 may be used by the synchronization frame selection sub-module 230, the slot selection sub-module 235, and the sequence selection sub-module 240 to select a synchronization frame, a slot within the selected frame and/or a sequence for transmitting a synchronization signal. In particular, the synchronization frame selection sub-module 230 may select the synchronization frame identified by the synchronization resource analyzer 225 as being used by one or more other UEs for transmitting the synchronization signal(s). In case no existing synchronization signals are detected during the scan performed by the scan module 220, the synchronization frame selection sub-module 230 may randomly select a synchronization frame to use for transmitting the synchronization signal.

Once the synchronization frame is selected, the slot selection sub-module 235 may then select one of the slots of the selected synchronization frame for transmitting the synchronization signal. For example, the slot selection sub-module 235 may select an empty slot if only one of the slots is determined to be empty by the synchronization resource analyzer 225. In case more than one slot is determined to be empty, the slot selection sub-module 235 may select one of the empty slots to use, either randomly or based on a location of the slot(s) used by the detected synchronization signal(s). For example, the slot selection sub-module 235 may select a slot that is next to a slot that is used by a synchronization signal with a highest relative energy level, as determined by the synchronization resource analyzer 225.

In the event all of the slots are determined to be in use, the slot selection sub-module 235 may select a slot based on the respective energy level of each of the synchronization signals in each of the slots. For example, each energy level determined by the synchronization resource analyzer 225 may be compared to a given threshold energy level by the slot selection sub-module 235. According to an example, the threshold energy level may be determined empirically, such as though experimentation or testing. The slot selection sub-module 235 may then select a slot to use based on a result of the comparisons. For example, in the event the energy levels of the synchronization signals in some slots do not satisfy the threshold energy level (e.g., are below the threshold), the slot selection sub-module 235 may select a slot that has a lowest relative energy level of the synchronization signal(s) therein for transmitting a synchronization signal. On the other hand, if the energy levels of the synchronization signals in all of the slots satisfy the threshold energy level (e.g., are at or above the threshold), the slot selection sub-module 235 may refrain from selecting a slot. Thus, in such case, the UE 115-*f* may abstain from transmitting a synchronization signal.

Once a slot is selected by the slot selection sub-module 235, the sequence selection sub-module 240 may determine or select a sequence to use for the synchronization signal to be transmitted by the UE 115-*f*. In the event the selected slot is determined to be empty, the sequence selection sub-module 240 may select any sequence from an allowable set of sequences. According to one example, the set of allowable sequences may be stored in the allowable sequences database 245. The allowable set of sequences may be predetermined and preloaded into the allowable sequences database 245, or may be obtained from a base station 105 (shown in FIG. 1). In some examples, the sequence may be selected randomly. In some cases, certain sequences may be reserved, for example, for in-network UE synchronization signals (e.g., synchronization signals of UEs connected to a wide area network (WAN)). Reserving and categorizing some of the synchronization sequences, may allow a UE to decode some information immediately upon detecting such sequences, even before decoding the accompanying timing information block (TIB) symbols, for example. This may help to make synchronization more efficient and/or accurate and may provide for a faster synchronization overall. Alternatively or additionally, certain sequences may be reserved for UEs that have GPS (global positioning system) connectivity, for example. Such reserved sequences may thus indicate that the timing for the UE(s) comes from GPS and has GPS reliability and/or accuracy. In some examples, the selected sequence may convey miscellaneous information about the UE, such as, for example, whether a UE is connected to WAN or not, among other.

On the other hand, if the selected slot is determined to be in use, the sequence selection sub-module 240 may select a sequence from the allowable set of sequences other than the sequence being used for the synchronization signal having a highest relative energy level in the selected slot. In other words the sequence selection sub-module 240 may select a sequence that is different from the sequence used by a dominant transmitter.

Figure 3:
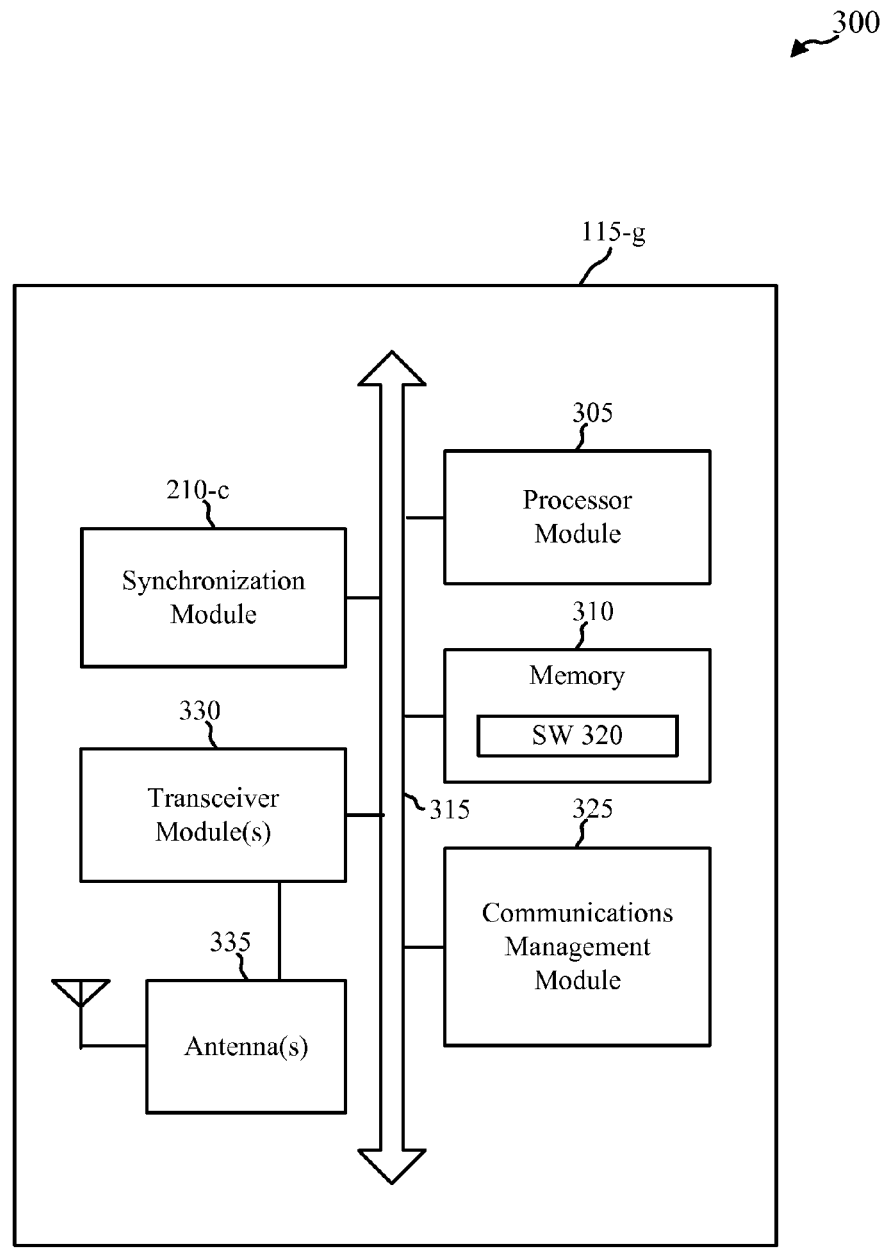
FIG. 3 shows a block diagram of an example of hardware that may be used to implement a UE.

FIG. 3 is an example of a block diagram 300 of a UE 115-*g*. The UE 115-*g* may be an example of one or more aspects of the UEs 115 described with reference to FIGS. 1, 2A, and/or 2B. The UE 115-*g* may have any of various configurations, such as personal computers (e.g., laptop computers, netbook computers, tablet computers, etc.), cellular telephones, PDAs, digital video recorders (DVRs), internet appliances, gaming consoles, e-readers, etc. The UE 115-*g* may have an internal power supply (not shown), such as a small battery, to facilitate mobile operation.

The UE 115-*g* may include a processor module 305, memory 310, a communications management module 325, transceiver module(s) 330, and antenna(s) 335, all of which may be in a direct or indirect communication with each other via, for example, a bus 315. The transceiver module(s) 330 may be configured to communicate bi-directionally, via the antenna(s) 335 and/or one or more wired or wireless links, with one or more networks, as described above. For example, the transceiver module(s) 330 may be configured to communicate bi-directionally with one or more of base stations 105 described with reference to FIG. 1. The transceiver module(s) 330 may also be configured to communicate with one or more other UEs 115 as described above. The transceiver module(s) 330 may operate under control by the communications management module 325. The transceiver module(s) 330 may include a modem configured to modulate packets and provide the modulated packets to the antenna(s) 335 for transmission, and to demodulate packets received from the antennas(s) 335. While the UE 115-*g* may include a single antenna, the UE 115-*g* will typically include multiple antennas 335 for multiple links.

The memory 310 may include random access memory (RAM) and/or read-only memory (ROM). The memory 310 may store computer-readable, computer-executable software code 320 containing instructions that are configured to, when executed, cause the processor module 305 to perform various functions (e.g., call processing, scanning, analyzing, etc.). Alternatively, the software code 320 may not be directly executable by the processor module 305, but may be configured to cause the UE 115-g (e.g., when compiled and executed) to perform various of the functions described herein.

The processor module 305 may include an intelligent hardware device, such as a central processing unit (CPU), a microcontroller, an ASIC, etc. The processor module 305 may include a speech encoder (not shown) configured to receive audio via a microphone, convert the audio into packets (e.g., 30 ms in length) representative of the received audio, provide the audio packets to the transceiver module(s) 330, and provide indications of whether a user is speaking. Alternatively, an encoder may only provide packets to the transceiver module(s) 330, with the provision or withholding/suppression of the packet itself providing the indication of whether a user is speaking.

According to the architecture of FIG. 3, the UE 115-g may further include a synchronization module 210-c. By way of example, the synchronization module 210-c may be in communication with some or all of the other components of the UE 115-g via the bus 315. Alternatively, functionality of the synchronization module 210-c may be implemented as a computer program product, and/or as one or more controller elements of the processor module 305. The synchronization module 210-c may be configured to perform the various functions described herein, such as described with respect to FIGS. 2A and/or 2B.

The components of the UE 115-g may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-g.

Figure 4:
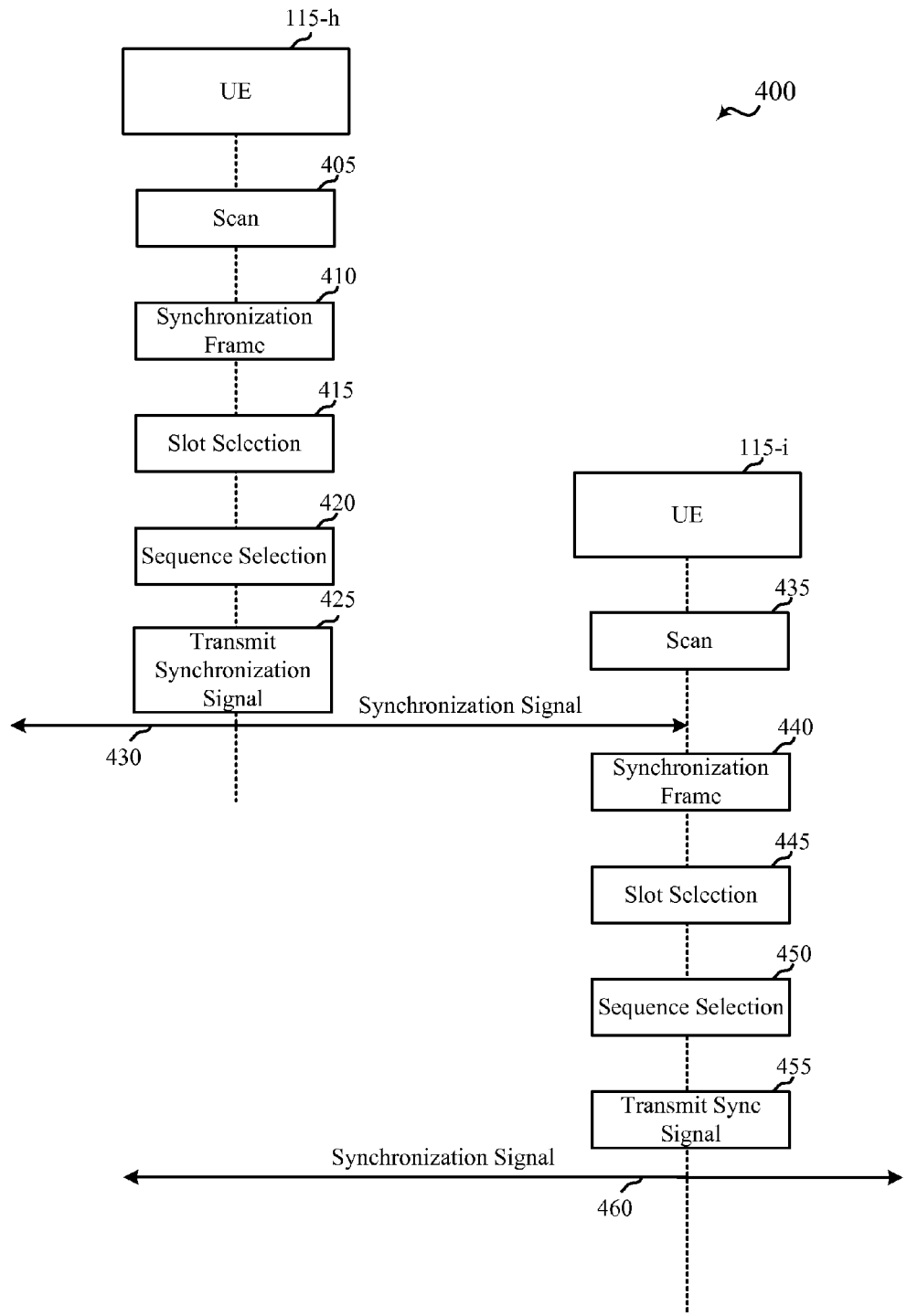
FIG. 4 illustrates an example of synchronization between UEs in a device-to-device communications network.

Turning to FIG. 4, an illustration of an example of synchronization 400 between UEs in a device-to-device communications network is shown. It should be understood that this is a relatively simple example, and that more complex operations (e.g., analysis) may be involved when a larger number of UEs transmit synchronization signals via the slots of the same synchronization frame.

As shown in FIG. 4, a UE 115-h may be a first UE in the network to transmit a synchronization signal. Prior to transmitting the synchronization signal, the UE 115-h may perform a scan, as indicated at block 405, to determine if any existing synchronization signals are being transmitted by other UEs. In the event no synchronization signals are detected during the scan the UE 115-h may identify a synchronization frame for transmission of its synchronization signal, as indicated at block 410. In some cases, the synchronization frame may be identified with little or no analysis. For example, the UE 115-h may use a random selection process to select the synchronization frame. The UE 115-h may then select a slot of the selected synchronization frame, as indicated at block 415. The slot selection may also be performed without much or any analysis, and may be random, for example.

After selecting the slot, the UE 115-h may select a sequence for the synchronization signal to be transmitted via the selected slot of the selected synchronization frame, as indicated at block 420. As discussed above, the UE 115-h may select the sequence to use from an allowable set of sequences. Alternatively, in the event some of the sequences are reserved, the UE 115-h may select the sequence to use from an allowable subset of sequences. According to one example, the selection may be performed randomly. The UE 115-h may then transmit the synchronization signal 425 that includes the selected sequence via the selected slot of the selected synchronization frame, as indicated at block 425.

Once the first UE 115-h transmits its synchronization signal, another UE 115-i may subsequently perform operations to transmit a synchronization signal. Similar to UE 115-h, the UE 115-i may begin by performing a scan, as indicated at block 435, to determine if existing synchronization signals are being transmitted by other UEs. Since the UE 115-h transmitted the synchronization signal 430 before the UE 115-i began the scan operation, the UE 115-i detects the synchronization signal 430 during the scan. The UE 115-i may identify the synchronization frame of the synchronization signal 430 as the frame to use for transmitting its synchronization signal, as indicated at block 440. The UE 115-i may then select a slot of the identified synchronization frame, as indicated at block 445. The slot selection may be performed with suitable analysis of the slots of the identified synchronization frame. For example, the UE 115-i may determine that all of the slots of the identified synchronization frame are empty other than the slot selected and used by the UE 115-h for transmitting its synchronization signal, in which case the UE 115-i may select one of the empty slots according to the selection process discussed above.

Following the slot selection process, the UE 115-i may select a sequence for its synchronization signal, as indicated at block 450. In particular, as discussed above with respect to the UE 115-h, the UE 115-i may select a sequence to use from the allowable subset of sequences. This selection may also be performed randomly. The UE 115-h may transmit a synchronization signal 460 having the selected sequence via the selected slot of the identified synchronization frame as indicated at block 455.

Figure 5:
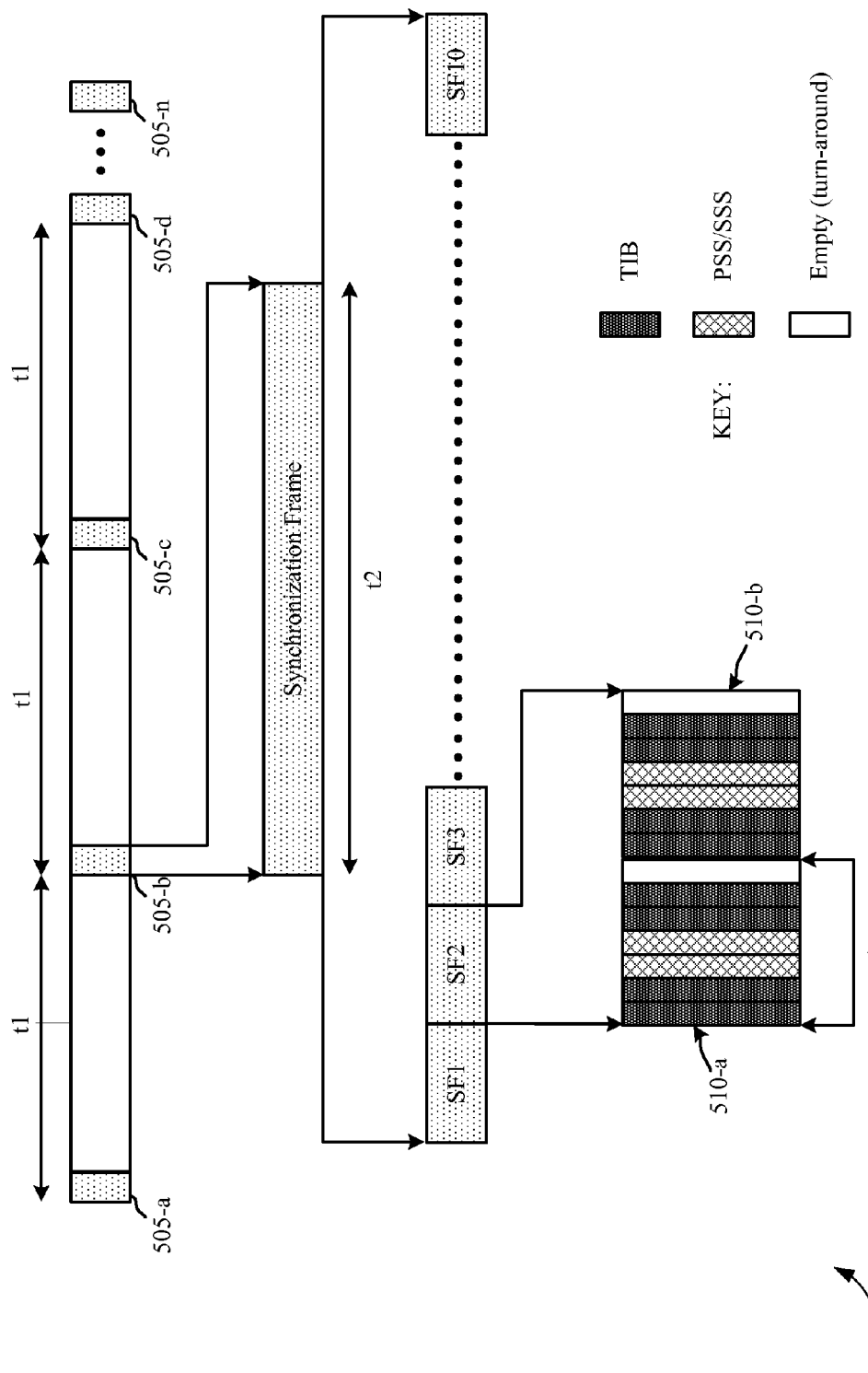
FIG. 5 illustrates an example of a design for overall system resource allocation for synchronization.

FIG. 5 illustrates an example of a design 500 for overall system resource allocation for synchronization by UEs for device-to-device communications. As shown, the design may involve allocating one 10 millisecond LTE frame 505 for transmission of synchronization signals by UEs periodically. For example, as shown in the figure, the synchronization frames 505-a, 505-b . . . 505-n may be allocated at an elapse of a time period t1. The time period t1, in some examples, may be determined based on a particular implementation. However, in general, the time period t1 may be significantly longer than the typical time period (e.g. five milliseconds) at which synchronization signals are broadcast by a base station. According to an example, the time period t1 may be on the order of one second.

The longer time period between transmissions of synchronization signals may result in significant power savings, as noted above. However, this may adversely impact performance of the receiver(s) of the signals in terms of being able to track time and/or frequency errors accurately. Such impact may be mitigated by using multiple UEs to transmit synchronization signals in different time-orthogonal resources.

Referring back to FIG. 5, the synchronization frame 505-b is shown expanded into ten subframes (SF1, SF2 . . . SF10), each being one millisecond long. Further, subframe SF2 is shown expanded into two 0.5 millisecond slots 510-a and 510-b as an example of each of the subframes. Thus, the synchronization frames 505 each include twenty slots in which synchronization signals may be transmitted, allowing for packing of 20 UEs per synchronization frame.

Referring to slot 510-a, corresponding to slot 3 of the synchronization frame 505-b, there may be seven symbols per slot for carrying a synchronization signal (e.g., PSS/SSS) and other information (e.g., TIB/Rendezvous). In particular, two symbols of the slot may carry a repeated PSS/SSS sequence, four symbols of the slot may carry a timing information block (TIB), and one symbol may be left empty for turn-around. TIB may include any further information that may enhance system level synchronization. For example, TIB may include the position of the current slot in the corresponding synchronization frame, information about the synchronization accuracy of the UE, the stratum level (i.e., the number of hops to a WAN from the UE), and/or information about the reliability of the timing reference being used by the UE. Such information may be used to resolve system-level issues and may enable system-level synchronization algorithms (e.g., that may be applied by UEs to modify their timing after receiving synchronization signals from other UEs). The empty symbol of the slot may help to reduce interference from one slot to the next, such as due to timing offsets and/or propagation delays.

Figure 6:
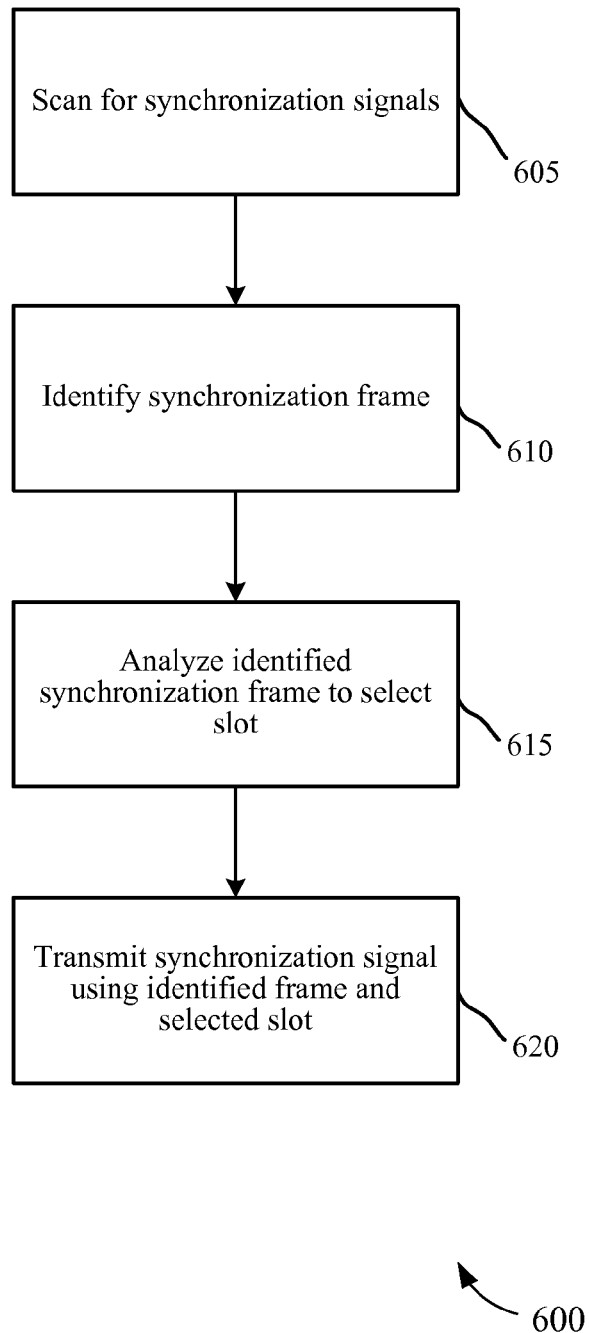
FIG. 6 is a flowchart of an exemplary method of synchronization by a UE in a device-to-device communications network.

FIG. 6 is a flowchart illustrating an example of a method 600 of synchronization by a UE in a device-to-device communications network. For clarity, the method 600 is described below with reference to one of the UEs 115 shown in FIGS. 1, 2A, 2B, and/or 3. In one implementation, the synchronization module 210 described with reference to FIGS. 2A and/or 2B, or the various modules described with reference to FIG. 3, may execute one or more sets of codes to control the functional elements of a UE 115 to perform the functions described below.

As indicated at block 605, the method of synchronization may begin with the UE 115 scanning for existing synchronization signals transmitted by other UEs. In some examples, the scanning may be performed by the synchronization module 210 described with reference to FIGS. 2A and/or 3, the scan module 220 described with reference to FIG. 2B, and/or the receiver module 205 described with reference to FIGS. 2A and/or 2B, and/or the transceiver modules 330 described with reference to FIG. 3. Thus, any of these elements may be considered to be means for scanning, either alone or in combination.

Result of the scan may be used by the UE 115 to identify and/or select a synchronization frame as indicated at block 410. As discussed above, the synchronization frame may be selected either randomly or the synchronization frame identified for the detected synchronization signals may be selected. In some examples, the identifying and/or selecting may be performed by the synchronization module 210 described with reference to FIGS. 2A, 2B and/or 3, the synchronization resource analyzer 225 described with reference to FIG. 2B, and/or the synchronization frame selection sub-module 230 described with reference to FIG. 2B. Thus, any of these elements may be considered to be means for identifying and/or means for selecting a synchronization frame, either alone or in combination.

Once the synchronization frame has been identified/selected, the UE 115 may, analyze the selected synchronization frame to select a slot thereof to use for transmitting synchronization signal, as indicated at block 615. As discussed above, the analysis may involve determining the status of the slots (e.g. empty or in use), and/or the relative energy levels of synchronization signals in the slots. In some examples, the analyzing and/or selecting may be performed by the synchronization module 210 described with reference to FIGS. 2A, 2B and/or 3, the synchronization resource analyzer 225 described with reference to FIG. 2B, and/or the synchronization slot selection sub-module 235 described with reference to FIG. 2B. Thus, any of these elements may be considered to be means for analyzing and/or means for selecting a slot, either alone or in combination.

Following selection of the slot, the UE 115 may transmit a synchronization signal via the selected slot of the selected synchronization frame, as indicated at block 620. In some examples, the transmitting may be performed by the synchronization module 210 described with reference to FIGS. 2A, 2B and/or 3, and/or the transmitter module 215 described with reference to FIGS. 2A and/or 2B, and/or transceiver module(s) and/or the antenna(s) described with reference to FIG. 3. Thus, any of these elements may be considered to be means for transmitting, either alone or in combination.

Figure 7:
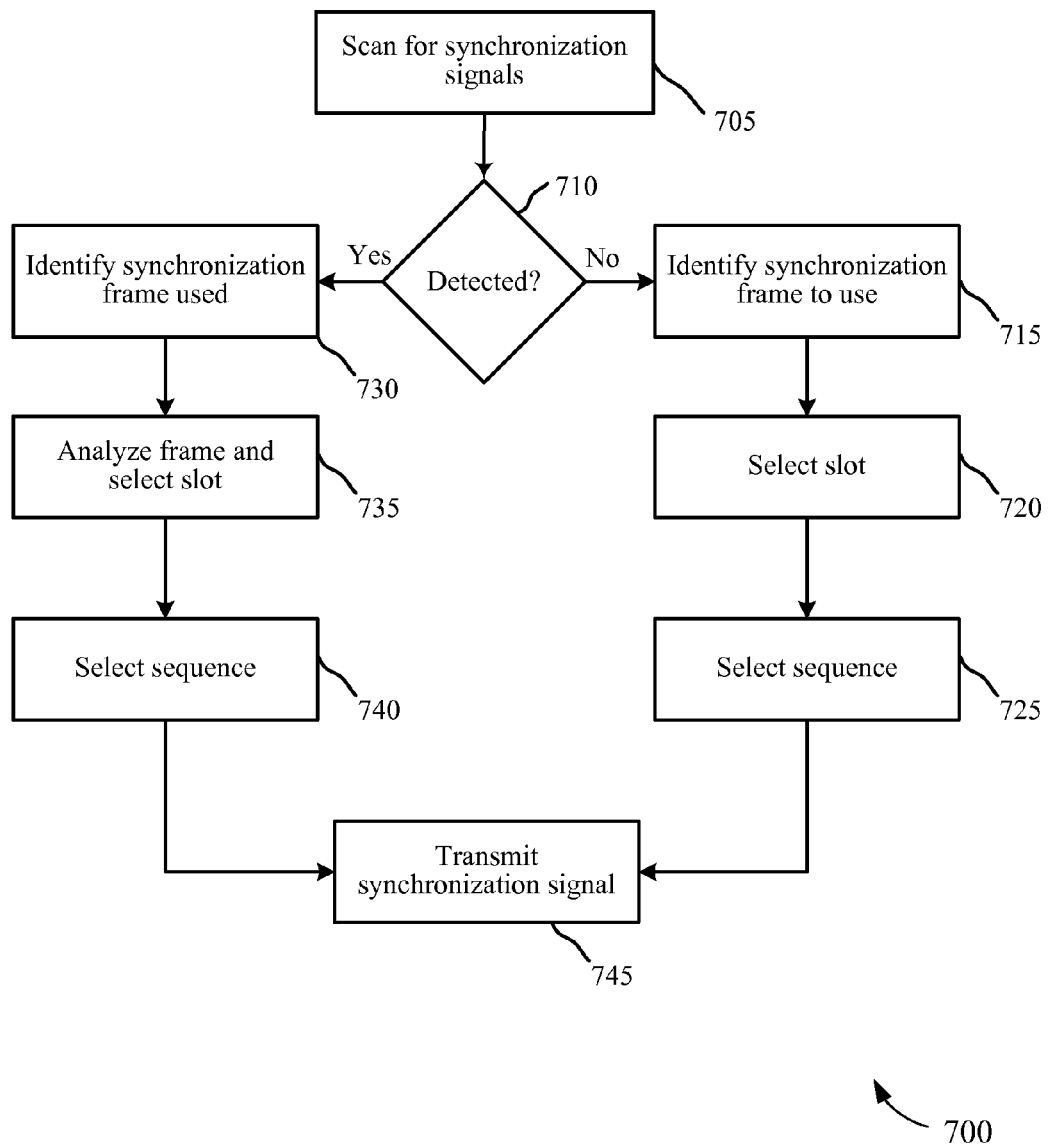
FIG. 7 is a flowchart of an exemplary method of synchronization by a UE in more detail and including operations for when an existing synchronization signal is detected and when an existing synchronization signal is not detected.

FIG. 7 is a flowchart illustrating another example of a method 700 of synchronization by a UE in a device-to-device communications network. For clarity, the method 700 is described below with reference to one of the UEs 115 shown in FIGS. 1, 2A, 2B, and/or 3. In one implementation, the synchronization module 210 described with reference to FIGS. 2A and/or 2B, or the various modules described with reference to FIG. 3, may execute one or more sets of codes to control the functional elements of a UE 115 to perform the functions described below.

Similar to the method disclosed above, the UE 115 may begin synchronization by scanning for existing synchronization signals transmitted by other UEs, as indicated at block 705. The UE 115 may use result of the scan to determine whether or not any synchronization signals have been detected during the scan, as indicated at block 710. In some examples, this determination may be performed by the synchronization module 210 described with reference to FIGS. 2A, 2B and/or 3, and/or the synchronization resource analyzer 225 described with reference to FIG. 2B. Thus, any of these elements may be considered to be means for determining whether or not synchronization signal are detected as a result of the scan, either alone or in combination.

In the absence of synchronization signals transmitted by other devices, the UE 115 may identify and/or select a synchronization frame to use for sending its synchronization signal, for example, by randomly selecting a synchronization frame. Once the synchronization frame is identified/selected at block 715, the UE 115 may select a slot of the identified/selected synchronization frame to use, as indicated at block 720.

Following the slot selection at block 720, the UE 115 may proceed to select a sequence for the synchronization signal to be transmitted as indicated at block 725. As discussed above, the sequence selection may involve randomly selecting a sequence from a set or subset of allowable sequences. In some examples, the sequence selection may be performed by the synchronization module 210 described with reference to FIGS. 2A, 2B and/or 3, and/or the sequence selection sub-module 240 described with reference to FIG. 2B, for example, by accessing the allowable sequences database also described with reference to FIG. 2B. Thus, any of these elements may be considered to be means for selecting a sequence, either alone or in combination.

The UE 115 may then transmit a synchronization signal having the selected sequence via the selected slot of the selected synchronization frame, as indicated at block 745.

In the event one or more synchronization signals are detected at block 710, the method may continue to block 730, at which point the UE 115 may identify and/or select a synchronization frame to use for sending a synchronization signal. As discussed above, since one or more synchronization signals are detected, the synchronization frame identified for the detected synchronization signal(s) may be selected in this case.

Once the synchronization frame is identified/selected at block 730, the UE 115 may proceed to select a slot of the identified/selected synchronization frame to use for sending the synchronization signal, as indicated at block 735. As discussed above, selection of the slot may be based on an analysis of the status of the slots, location of the slots, and/or relative energy levels of the synchronization signals in the slots.

Following the slot selection operation at block 735, the UE 115 may select a sequence for the synchronization signal to be transmitted, as indicated at block 740. As discussed above, the sequence selection may involve randomly selecting a sequence from a set of allowable sequences. According to one example, a sequence being used for a detected/identified synchronization signal having a highest relative energy level may be excluded from the selection process. In particular, a sequence being used for a detected/identified synchronization signal having a highest relative energy level that is in the slot to be used by the UE 115 for transmission of its synchronization signal may be excluded.

Once the sequence for the synchronization signal is selected, the method may continue to block 745, at which point the UE 115 may transmit the synchronization signal having the selected sequence via the selected slot of the selected synchronization frame as determined at blocks 730, 735 and 740.

Figure 8:
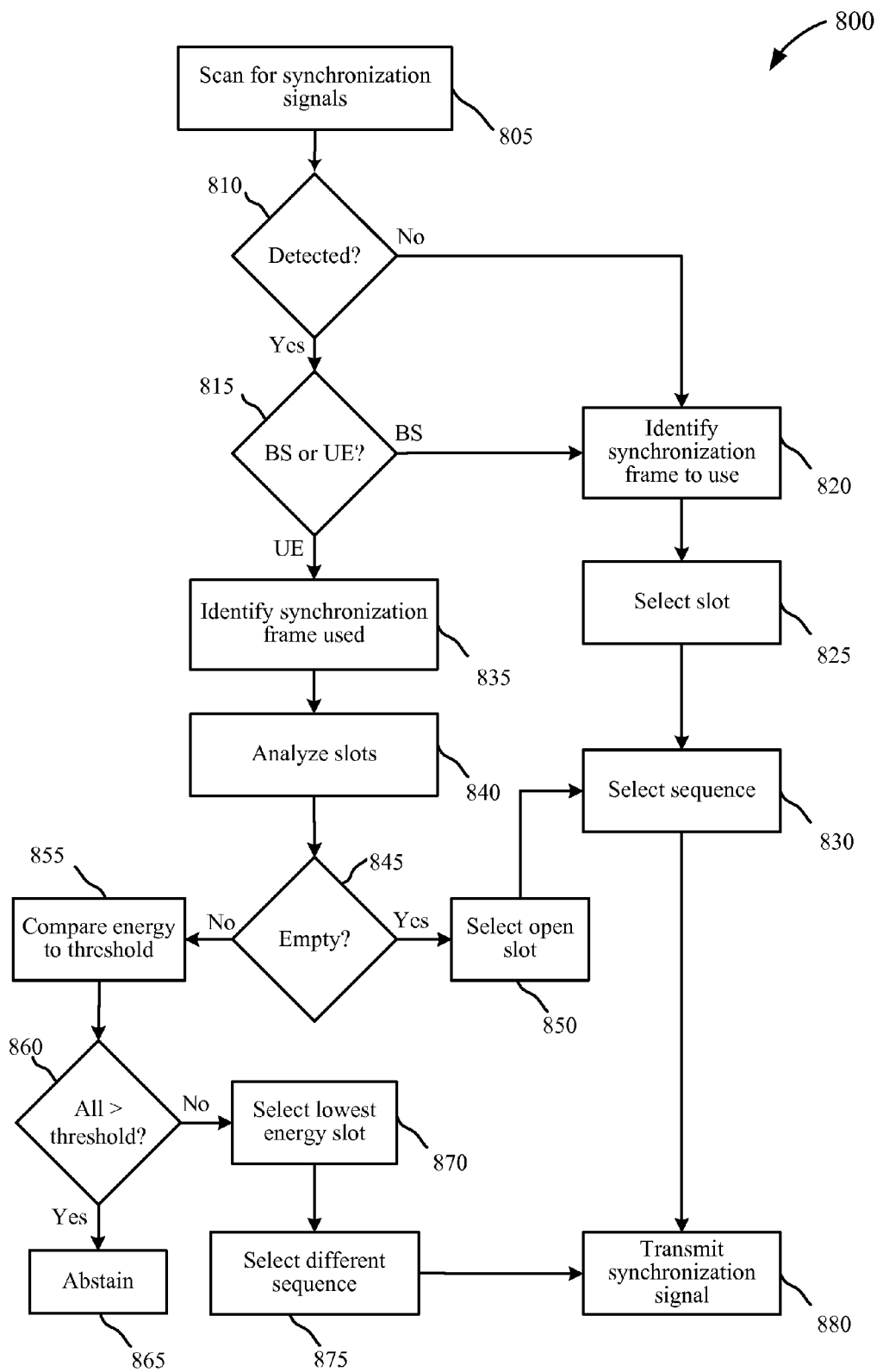
FIG. 8 is a flowchart of another exemplary method of synchronization by a UE including operations slot selection and sequence selection.

FIG. 8 is a flowchart illustrating yet another example of a method of synchronization by a UE in a device-to-device communications network. For clarity, the method 800 is described below with reference to one of the UEs 115 shown in FIGS. 1, 2A, 2B, and/or 3. In one implementation, the synchronization module 210 described with reference to FIGS. 2A and/or 2B, or the various modules described with reference to FIG. 3, may execute one or more sets of codes to control the functional elements of a UE 115 to perform the functions described below.

Similar to the previously discussed methods, the UE 115 may begin by scanning for existing synchronization signals transmitted by other UEs, as indicted at block 805. The UE may use a result of the scan to determine whether or not any synchronization signals are detected, as indicated at block 810.

In the event no synchronization signals are detected during the scan, the method may continue to block 820. Alternatively, when one or more synchronization signals are detected during the scan, the method may continue to block 815, at which point the UE may determine whether the detected synchronization signals are transmitted from a base station or from another UE. If at least one detected synchronization signal is from a base station, the method may continue to block 820. Otherwise, when one or more detected synchronization signals are identified as being from other UEs, the method may continue to block 835. In some examples, this determination may be performed by the synchronization module 210 described with reference to FIGS. 2A, 2B and/or 3, and/or the synchronization resource analyzer 225 described with reference to FIG. 2B. Thus, any of these elements may be considered to be means for determining whether detected synchronization signals are from base stations or from other UEs, either alone or in combination.

At block 820, the UE 115 may identify and/or select a synchronization frame to use for sending a synchronization signal, for example, by using a random selection process.

Once the synchronization frame is identified/selected at block 820, the UE 115 may proceed to select a slot of the identified/selected synchronization frame. According to one example, the slot may also be selected randomly.

Following the selection of the slot, the UE 115 may proceed to select a sequence for the synchronization signal to be transmitted, as indicated at block 830. As discussed above, the sequence selection may involve randomly selecting a sequence from a set or a subset of allowable sequences. Once the sequence is selected, the method may continue to block 880, at which point the UE 115 may transmit the synchronization signal having the selected sequence via the selected slot of the selected synchronization frame as determined at blocks 820, 825 and 830.

In the event the detected synchronization signals are determined to be from other UEs (i.e., none of the detected synchronization signals is from a base station), the UE 115 may proceed to identify and/or select a synchronization frame to use for sending the synchronization signal, as indicated at block 835. For example, the UE 115 may select the synchronization frame identified for the detected synchronization signal(s).

Once the synchronization frame is identified/selected at block 835, the UE 115 may, analyze the slots of the identified/selected synchronization frame, as indicated at block 840. As discussed above, the analysis of the slots may be with regard to status, location, and/or relative energy levels of the synchronization signals in the slots. According to an example, the UE 115 may determine whether any of the slots are empty, as indicated at block 845. If one or more slots are empty, the UE 115 may select an empty slot to use for transmitting the synchronization signal. In one example, if more than one slot is determined to be empty, the selection may be done randomly. Alternatively, the selection may be based on a location of an existing synchronization signal. Following the selection of the slot, the method may continue through block 830 to block 880, at which the UE 115 may transmit a synchronization signal having the selected sequence via the selected slot of the selected synchronization frame as determined at blocks 835, 850 and 830.

In the even all of the slots are used (i.e. none of the slots are empty), the method may continue to block 855, at which point the UE 115 may compare the energy levels of the synchronization signals in the slots to a threshold energy level. In some examples, the comparison may be performed by the synchronization module 210 described with reference to FIGS. 2A, 2B and/or 3, the synchronization resource analyzer 225 described with reference to FIG. 2B, and/or the slot-selection sub-module 235 also described with reference to FIG. 2B. Thus, any of these elements may be considered to be means for comparing energy levels of synchronization signals to a threshold energy level, either alone or in combination. In some examples, one of such modules may include a comparator to perform the comparison.

As indicated at block 860, the UE may determine whether all of the detected synchronization signals have respective energy levels that satisfy the threshold energy level by, for example, exceeding the threshold. This determination may, for example, be made by the same means as the means for comparing the energy levels as above.

If all of the slots include synchronization signals that have respective energy levels that satisfy the threshold energy level, the method may continue to block 865, at which point the UE may abstain from selecting a slot and from transmitting a synchronization signal. Otherwise, as long as one slot does not include a synchronization signal with an energy level that satisfies the threshold energy level, the method may continue to block 870, at which point the UE 115 may select a slot having a synchronization signal of a lowest relative energy (i.e., the slot who's highest energy level signal is lowest as compared to the highest energy level signals of the other slots not having a synchronization signal that satisfies the threshold).

Following the selection of the slot, the UE 115 may proceed to select a sequence for the synchronization signal to be transmitted, as indicated at block 875. As discussed above, the sequence selection may involve selecting a sequence that is different from the sequence of the synchronization signal with the highest energy level in the selected slot. The sequence may also be selected from the set or subset of allowable sequences. The method may continue to block 880, at which point the UE 115 may transmit a synchronization signal having the selected sequence via the selected slot of the selected synchronization frame as determined at blocks 835, 870 and 875.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of synchronization by a user equipment (UE) in a device-to-device communications network, comprising:
scanning for a synchronization signal transmitted from another user equipment in the network;
identifying a synchronization frame including a plurality of slots to use based at least in part on a result of the scanning, wherein the synchronization frame is randomly selected when no existing synchronization signal is detected by the scanning;
analyzing the identified synchronization frame to select a slot to use from the plurality of slots of the synchronization frame; and
transmitting a synchronization signal using the identified synchronization frame and the selected slot.

2. The method of claim 1, wherein analyzing comprises:
identifying a plurality of empty slots in the synchronization frame; and
randomly selecting the slot to use from the plurality of empty slots.

3. The method of claim 1, wherein selecting the slot to use comprises:
selecting the slot to use from the plurality of slots of the synchronization frame based at least in part on a synchronization resource being used by a base station in the network as detected by the scanning.

4. The method of claim 1, wherein identifying the synchronization frame to use comprises:
determining the synchronization frame to use based at least in part on a synchronization resource being used by a base station in the network as detected by the scanning.

5. The method of claim 1, further comprising:
identifying a synchronization resource being used when at least one existing synchronization signal transmitted from another user equipment in the network is detected by the scanning; and
selecting a slot of the identified synchronization frame of the identified synchronization resource.

6. The method of claim 5, wherein selecting the slot of the identified synchronization frame of the identified synchronization resource comprises:
selecting a different slot of the plurality of slots than slots being used for the detected at least one existing synchronization signal.

7. The method of claim 6, wherein selecting the different slot comprises:
randomly selecting the different slot from the plurality of slots other than slots being used for the detected at least one existing synchronization signal.

8. The method of claim 6, wherein selecting the different slot comprises:
selecting the different slot to use based at least in part on a location of the slots being used for the detected at least one existing synchronization signal within the identified synchronization frame.

9. The method of claim 5, further comprising:
determining a sequence of the detected at least one existing synchronization signal having a highest energy level; and
selecting a sequence for the synchronization signal to be transmitted that is different from the determined sequence of the detected at least one existing synchronization signal having the highest energy level.

10. The method of claim 5, further comprising:
determining whether one or more slots of the plurality of slots of the identified synchronization frame are empty;
upon determining one or more slots to be empty, selecting one of the one or more empty slots.

11. The method of claim 10, further comprising:
selecting a sequence for the synchronization signal to be transmitted from an allowable set of sequences.

12. The method of claim 11, wherein the allowable set of sequences excludes sequences reserved for in network user equipment.

13. The method of claim 5, further comprising:
determining whether one or more slots of the plurality of slots of the identified synchronization frame are empty; and
upon determining none of the slots to be empty, determining an energy level of each of the detected existing synchronization signals in the plurality of slots.

14. The method of claim 13, further comprising:
comparing each determined energy level to a threshold energy level; and
abstaining from the selecting of a slot to use and abstaining from transmitting the synchronization signal based at least in part on a result of the comparing.

15. The method of claim 14, further comprising:
abstaining from the selecting of a slot to use and abstaining from transmitting the synchronization signal when the result of the comparing is that each determined energy level satisfies the threshold energy level.

16. The method of claim 13, further comprising:
comparing each determined energy level to a threshold energy level; and
selecting a slot of the plurality of slots with a detected synchronization signal having a lowest energy level to perform the selecting of the slot to use based at least in part on a result of the comparing.

17. The method of claim 16, further comprising:
selecting a sequence for the synchronization signal to be transmitted from an allowable set of sequences.

18. The method of claim 17, wherein the allowable set of sequences excludes sequences reserved for in network user equipment.

19. The method of claim 16, further comprising:
selecting the slot of the plurality of slots with the detected synchronization signal having the lowest energy level when the result of the comparing is that at least one of the determined energy levels fails to satisfy the threshold energy level.

20. The method of claim 19, further comprising:
selecting a sequence for the synchronization signal to be transmitted that is different from a determined sequence of the detected synchronization signal having a highest energy level in the selected slot.

21. The method of claim 20, further comprising:
selecting the sequence for the synchronization signal to be transmitted from an allowable set of sequences.

22. The method of claim 21, wherein the allowable set of sequences excludes sequences reserved for in-network user equipment.

23. An apparatus for synchronization in a device-to-device communications network, comprising:
means for scanning for a synchronization signal transmitted from another user equipment in the network;

means for identifying a synchronization frame including a plurality of slots to use based at least in part on a result of the scanning, wherein the synchronization frame is randomly selected when no existing synchronization signal is detected by the scanning;

means for analyzing the identified synchronization frame to select a slot to use from the plurality of slots of the synchronization frame; and means for transmitting a synchronization signal using the identified synchronization frame and the selected slot.

24. The apparatus of claim 23, wherein the means for analyzing comprises:

means for identifying a plurality of empty slots in the synchronization frame; and means for randomly selecting the slot to use from the plurality of empty slots.

25. The apparatus of claim 23, wherein the means for analyzing the identified synchronization frame to select a slot to use from the plurality of slots of the synchronization frame comprises:

means for selecting the slot to use from the plurality of slots of the synchronization frame based at least in part on a synchronization resource being used by a base station in the network as detected by the scanning.

26. The apparatus of claim 23, wherein the means for identifying the synchronization frame to use comprises:

means for determining the synchronization frame to use based at least in part on a synchronization resource being used by a base station in the network as detected by the scanning.

27. An apparatus for synchronization in a device-to-device communications network, comprising:

a processor;

a memory in electronic communication with the processor; and instructions stored in the memory, the instructions being executable by the processor to:

scan for a synchronization signal transmitted from another user equipment in the network;

identify a synchronization frame including a plurality of slots to use based at least in part on a result of the scanning, wherein the synchronization frame is randomly selected when no existing synchronization signal is detected by the scanning;

analyze the identified synchronization frame to select a slot to use from the plurality of slots of the synchronization frame; and transmit a synchronization signal using the identified synchronization frame and the selected slot.

28. A non-transitory computer-readable medium storing computer-executable code for wireless communication, the code executable by a processor to:

scan for a synchronization signal transmitted from another user equipment in the network;

identify a synchronization frame including a plurality of slots to use based at least in part on a result of the scanning, wherein the synchronization frame is randomly selected when no existing synchronization signal is detected by the scanning;

analyze the identified synchronization frame to select a slot to use from the plurality of slots of the synchronization frame; and transmit a synchronization signal using the identified synchronization frame and the selected slot.

* * * * *